2,956,884

COMPOSITIONS OF POLYACRYLATES WITH GELATIN AND OTHER PROTEINS

John R. Caldwell, Kingsport, Tenn., assignor to Eastman Kodak Company, Rochester, N.Y., a corporation of New Jersey No Drawing. Filed Mar. 26, 1957, Ser. No. 648,509

10 Claims. (Cl. 96—114)

This invention concerns the preparation of polymeric compositions, more particularly compositions comprising polyacrylates polymerized with gelatin.

Various polymerization compositions have been prepared from acrylic acid and acrylic acid esters along with other polymerizable materials and the like such as those disclosed in U.S. 2,140,048 to Fikentscher et al. However, when many of these polmerizable compositions have been used as sheets or films the resultant material has been unstable in hot or boiling water. In some cases, such products have completely disintegrated in boiling water. Attempts to improve the stability by insolubilization of gelatin have been made, for example, by incorporation into the composition of hardening agents such as salts, acids, formaldehyde, and the like, but these methods introduce elements into the polymeric compositions which are detrimental to photographic emulsions.

I have found that gelatin may be polymerized with acrylic acid esters to obtain the advantages of water resistance without introducing any of the above mentioned serious drawbacks in the prior art processes.

One object of this invention is to provide a method of preparing a polymeric composition comprising acrylic acid esters and acrylonitrile polymerized with gelatin. Another object is to provide a modified gelatin that has improved resistance to water and that is especially valuable for use in the photographic arts. A further object is to provide films, fibers, sheets and the like made from compositions of acrylates polymerized with gelatin.

The objects of this invention are accomplished by polymerizing acrylic acid esters or acrylonitrile in the presence of gelatin dissolved in water. The solutions or dopes so obtained can be coated or cast to give films. They can be extruded through suitable spinnerettes to make fibers. The solutions can also be coated on textile fabrics to give flexible, tough, leather-like products, may also be used as sizing agents for textiles and paper and may be used in water-base paints.

The products containing acrylate polymerized in combination with gelatin are especially valuable for the preparation of photosensitive silver halide emulsions used in photography. A gelatin modified by the process of this invention shows a reduced tendency to swell in water, but at the same time is capable of imbibing developing agents, fixing agents and the like. Photographic films made with the modified gelatin can be processed in relatively warm water without wrinkling or reticulation of the gelatin layer. Furthermore, the films can be stored at high temperatures and humidities without deterioration. The modified gelatin products are also useful as subbing coats or photographic film base.

In carrying out my invention, gelatin is dissolved in water in which has been dispersed an acrylic acid ester so that 33–85% of the solids content is gelatin. The acrylic esters used in this process are derived from straight and branched-chain alcohols containing from 1–6 carbon atoms. Suitable esters are those derived from the following alcohols: methyl, ethyl, propyl, isopropyl, n-butyl, sec-amyl, cyclohexyl, and the like. Interpolymers of acrylic esters with other vinyl monomers in small amounts may be used. Suitable monomers include: vinyl acetate, methacrylic esters, vinyl ethers, vinyl chloride, acrylonitrile, methacrylonitrile, styrene, acrylic acid, methacrylic acid, maleic acid, maleic esters, amides of acrylic and methacrylic acids, and the like. However, at least 50% of the interpolymer must be an acrylic ester.

From 0.5 to 5.0% by weight, based on the acrylate monomer of a cross-linking agent must be employed selected from the class consisting of divinyl benzene, diallyl phthalate, allyl acrylate, and acrylic esters of glycols.

Proteins other than gelatin may be used such as casein, zein, egg albumin, soy bean protein, cotton seed protein, cattle blood protein and wheat glutin. The preferred proteins are gelatin and zein. The composition of the compound may be varied depending upon the proportion of the protein incorporated in the polymeric material. Compositions containing from 65–85% protein tend to be relatively hard, whereas those containing from 33–53% protein are soft and flexible.

The polymerization is preferably carried out in water suspension. The protein is dissolved in water to give a solution of 5 to 30% concentration and the acrylate monomer is added. Emulsifying agents such as sodium salts of sulfated fatty alcohols, soaps, aromatic sulfonates and the like can be used but are not absolutely necessary.

Water soluble catalysts such as sodium persulfate, potassium persulfate, and hydrogen peroxide are employed when the reaction is run in an aqueous system. When the polymerization is carried out in an organic solvent, catalysts such as benzoyl peroxide, acetyl peroxide, and cumene hydroperoxide can be used. From 0.05% to 3.0%, and preferably 0.5% to 1.0% catalyst is used, based on the weight of the monomers.

In carrying out the invention, the gelatin is first dissolved in the water. The vinyl monomers, cross-linking agent (polyvinyl compound), catalyst, and emulsifying agent are then added. The mixture is then agitated at a temperature of 45–120° C. and preferably at 50–75° C. for 3–12 hours.

The final product is a smooth viscous emulsion or cream that contains no lumps or irregularities. It is ready for use at this stage and can be coated, extruded, or used for dipping, as desired. Evaporation of the emulsion leaves a clear strong film that shows good flexibility.

In some cases, it is advantageous to carry out the polymerization reaction in an organic solvent or an aqueous organic solvent. Suitable solvents are methyl alcohol, ethyl alcohol, isopropyl alcohol, glycol monoethyl ether, acetic acid, and dioxane. The cross-linking agents are added in a quantity of 0.5–5% and preferably 1.0–3.0% based on the weight of the acrylate monomer.

The following examples are intended to illustrate my invention but not to limit its scope:

Example 1

Eight grams gelatin were dissolved in 90 cc. of water and the following materials were added:

16 grams methyl acrylate
0.4 gram allyl phthalate
0.3 gram sodium dodecyl sulfate
0.2 gram potassium persulfate
1.0 cc. acetic acid The mixture was agitated at 50 C. for 24 hours. A smooth emulsion was produced. Evaporation of the water gave a clear, flexible film that was insoluble in water.

This composition is valuable for the preparation of photographic emulsions. For example, silver halide can be formed in the dispersion and the dispersion may then be coated on a plate or film. The dried coating can then be processed by the usual developers, fixers, and the like. The coating is resistant to swelling and reticulation in warm water and can be processed at temperatures appreciably higher than those with gelatin. This composition is also valuable as a subbing coat for film base made from cellulose acetate, cellulose nitrate, and synthetic linear polyesters such as polyethylene terephthalate. This composition is also valuable as a coating for textile fabrics. It was applied to a cotton fabric to give a coating of 1.0–1.5 ounces per square yard on a dry basis. The fabric was then dried at 100–110° C. and immersed in a 5% aqueous formaldehyde solution containing 0.5% ammonium chloride for 20 minutes. The fabric was then rinsed and dried. It was tested for water vapor transmission by a procedure based on A.S.T.M. test E96–53T, using a relative humidity of 100% on one side and 45% on the other side. It had a transmission rate of 700–900 g./24 hr./m.$^2$ of water vapor. A coating of polymethyl acrylate, tested under the same conditions had a transmission rate less than 150 g./24 hr./m.$^2$. The fabric coated with the methyl acrylate-gelatin composition held a six-foot hydrostatic head of water for 24 hours without leaking.

The coated fabric showed substantially no change after being dry cleaned by the usual method employing Stoddard solvent.

Example 2

Ninety grams of gelatin were dissolved in 900 cc. water, and the following materials were added:

180.0 grams ethyl acrylate
5.0 grams diallyl phthalate
2.5 grams sodium octadecyl sulfate
2.0 grams potassium persulfate The mixture was stirred at 60° C. for 8 hours and a smooth, opaque emulsion was produced. Films were coated on glass plates and the water evaporated at 50° C. Clear, highly flexible films were obtained which were insoluble in water at 70–80° C.

This composition was particularly useful as a subbing coat for photographic film base. It showed strong adhesion to the film base material and at the same time bonded well with the gelatin emulsion coating. This material may also be used as a gelatin extender by mixing with gelatin to improve the water resistance. For example, 100 cc. of the product (containing about 22 grams solids) was mixed with 100 cc. of 25% gelatin solution. Evaporation of the water gave a clear, tough film that did not wrinkle in water at 50° C. This composition is useful for the production of vapor-permeable, waterproof fabrics, as described in Example 1. It is also useful for the production of waterproof, vapor-permeable paper. Kraft wrapping paper was coated with the composition to give a weight increase of 0.8–1.0 ounce per square yard on a dry basis. The paper had a high wet strength and was waterproof to liquid water. At the same time, it had a high transmission rate for water vapor. It is useful for the packaging of fresh vegetables.

Example 3

Eighty-five grams gelatin were dissolved in 600 cc. water and the following materials were added:

15.0 grams methyl acrylate
0.2 gram potassium persulfate
0.1 gram divinyl benzene
2.0 cc. acetic acid The mixture was stirred at 50–60° C. for 12 hours. Evaporation of the solution give a clear, hard film that retained its shape in water at 40–45° C. This composition was used for the preparation of photographic emulsions with the addition of light-sensitive silver halide salts and was found to be a satisfactory substitute for gelatin.

Example 4

Fifty grams of gelatin were dissolved in 1000 cc. of water and the following materials were added:

60.0 grams ethyl acrylate
40.0 grams methacrylic acid
1.0 gram sodium dodecyl sulfate
1.0 gram potassium persulfate
3.0 grams divinyl benzene The mixture was stirred at 60–65° C. for 8 hours to give a smooth emulsion. A sample of the emulsion was coated on a glass plate and the water was evaporated at 60–70° C. to leave a clear tough film that showed excellent adhesion to the glass. This composition was useful as a subbing coat for photographic film base. It was further insolubilized by treating the coated film with a dilute solution of zirconium acetate.

Example 5

Using the general method described in Example 3, a polymer was made having the composition 63% gelatin, 33% methyl acrylate and 1% divinyl benzene. Films coated from the emulsion were clear and flexible. They swelled but did not break up in water at 70–80° C. When the divinyl benzene (cross-linking agent) was omitted, the films disintegrated at 70–80° C. This difference shows that all three components must be present in the reaction mixture. Gelatin itself dissolves completely at 70–80° C.

Example 6

Using the general method described in Example 1, a polymer was made having the composition 50% gelatin, 48% ethyl acrylate and 2% divinyl benzene. Films coated from the emulsion showed improvement over untreated gelatin on two counts: (A) they were much more flexible, especially at low humidity, (B) they did not break up or dissolve in water at 80–90° C. whereas untreated gelatin completely dissolved.

Example 7

The following materials were placed in a flask:

75.0 grams gelatin
25.0 grams acrylonitrile
0.3 gram ethylene glycol diacrylate
0.3 gram potassium persulfate
0.3 gram sodium bisulfite
900.0 cc. water The mixture was stirred at 60° C. for 12 hours to give a stable emulsion. The emulsion was coated on glass plates and the films were dried at 100–110° C. for 30 minutes. The films were swollen to a slight extent in water at 80–90° C. but they held their shape and did not disintegrate. In contrast to this, films made in a similar way except that the ethylene glycol diacrylate was omitted, disintegrated in water at 80–90° C. It is thus evident that the ethylene glycol diacrylate cross-links the acrylonitrile polymer to form a three-dimensional structure that insolubilizes the gelatin. Untreated gelatin films completely dissolved in water at 80–90° C.

In order to further insolubilize these polymeric compositions, they may be treated with 1–15% of a hardening agent for gelatin based on the weight of gelatin such as formaldehyde, trimethylol nitromethane, methylolurea, zirconium salts, trimethylol melamine, alum, aluminum chloride, and the like.

These materials may be used to coat textile fabrics for waterproofing. They are particularly useful for this purpose since they are permeable to water vapor although impermeable to liquid water. When used for coating fabrics, a hardener for gelatin is also used.

I claim:

1. A polymerization product obtained by polymerizing, at a temperature of 50–75° C. with a polymerization catalyst, a composition comprising an aqueous solution of gelatin and a mixture of an alkyl acrylate in which the alkyl radical contains 1–6 carbon atoms and a cross-linking agent selected from the class consisting of divinyl benzene, allyl acrylate and diallyl phthalate, said composition containing on a solids content basis from 33–85% by weight of the gelatin and from 15–67% by weight of the said mixture, the said mixture consisting of the alkyl acrylate and the cross-linking agent with the latter being present in an amount from 0.5–5% based on the weight of the alkyl acrylate.

2. A composition of matter comprising light-sensitive silver halide salts dispersed in a polymerization product obtained by polymerizing, at a temperature of 50–75° C. with a polymerization catalyst, a composition comprising an aqueous solution of gelatin and a mixture of an alkyl acrylate in which the alkyl radical contains 1–6 carbon atoms and a cross-linking agent selected from the class consisting of divinyl benzene, allyl acrylate and diallyl phthalate, said composition containing on a solids content basis from 33–85% by weight of the gelatin and from 15–67% by weight of the said mixture, the said mixture consisting of the alkyl acrylate and the cross-linking agent with the latter being present in an amount from 0.5–5% based on the weight of the alkyl acrylate.

3. A textile material coated with a polymerization product obtained by polymerizing, at a temperature of 50–75° C. with a polymerization catalyst, a composition comprising an aqueous solution of gelatin and a mixture of an alkyl acrylate in which the alkyl radical contains 1–6 carbon atoms and a cross-linking agent selected from the class consisting of divinyl benzene, allyl acrylate and diallyl phthalate, said composition containing on a solids content basis from 33–85% by weight of the gelatin and from 15–67% by weight of the said mixture, the said mixture consisting of the alkyl acrylate and the cross-linking agent with the latter being present in an amount from 0.5–5% based on the weight of the alkyl acrylate, and a hardening agent for gelatin selected from the class consisting of formaldehyde, trimethylol nitromethane, methylol-urea, zirconium salts, alum, aluminum chloride and trimethylol melamine.

4. A process for the formation of a polymeric composition comprising a polymerization product obtained by polymerizing, at a temperature of 50–75° C. with a polymerization catalyst, a composition comprising an aqueous solution of gelatin and a mixture of an alkyl acrylate in which the alkyl radical contains 1–6 carbon atoms and a cross-linking agent selected from the class consisting of divinyl benzene, allyl acrylate, and diallyl phthalate, said composition containing on a solids content basis from 33–85% by weight of the gelatin and from 15–67% by weight of the said mixture, the said mixture consisting of the alkyl acrylate aand the cross-linking agent with the latter being present in an amount from 0.5 to 5% based on the weight of the alkyl acrylate.

5. A process for the preparation of a polymeric composition comprising dissolving 33–85% by weight, based on the weight of the total polymeric composition, of gelatin in water to give a solution, adding an alkyl acrylate monomer in which the alkyl group contains 1–6 carbon atoms, adding 0.5 to 5% by weight based on the acrylate monomer of divinyl benzene, 0.1 to 1.0% by weight, based on the weight of the acrylate monomer of an alkali metal salt of sulfurous acid and from 0.05 to 3.0% by weight, based on the acrylate monomer, of potassium persulfate, polymerizing the mixture by heating at a temperature of from 50–75° C. and cross-linking by adding 1–15% by weight, based on the weight of the gelatin, of a hardening agent for gelatin, said polymeric composition containing on a solids content basis 15–67% of the acrylate.

6. A composition of matter comprising a film base containing thereon a polymerization product obtained by polymerizing, at a temperature of 50–75° C. with a polymerization catalyst a composition comprising an aqueous solution of gelatin and a mixture of an alkyl acrylate in which the alkyl radical contains 1–6 carbon atoms and a cross-linking agent selected from the class consisting of divinyl benzene, allyl acrylate and diallyl phthalate, said composition containing on a solids content basis from 33–85% by weight of the gelatin and from 15–67% by weight of the said mixture, the said mixture consisting of the alkyl acrylate and the cross-linking agent with the latter being present in an amount from 0.5–5% based on the weight of the alkyl acrylate.

7. A composition of matter comprising a cellulose ester film base containing thereon a polymerization product obtained by polymerizing, at a temperature of 50–75% C. with a polymerization catalyst, a composition comprising an aqueous solution of gelatin and a mixture of an alkyl acrylate in which the alkyl radical contains 1–6 carbon atoms and a cross-linking agent selected from the class consisting of divinyl benzene, allyl acrylate and diallyl phthalate, said composition containing on a solids content basis from 33–85% by weight of the gelatin and from 15–67% by weight of the said mixture, the said mixture consisting of the alkyl acrylate and the cross-linking agent with the latter being present in an amount from 0.5–5% based on the weight of the alkyl acrylate.

8. A composition of matter comprising a polyethylene terephthalate film base containing thereon a polymerization product obtained by polymerizing, at a temperature of 50–75° C. with a polymerization catalyst, a composition comprising an aqueous solution of gelatin and a mixture of an alkyl acrylate in which the alkyl radical contains 1–6 carbon atoms and a cross-linking agent selected from the class consisting of divinyl benzene, allyl acrylate and diallyl phthalate, said composition containing on a solids content basis from 33–85% by weight of the gelatin and from 15–67% by weight of the said mixture, the said mixture consisting of the alkyl acrylate and the cross-linking agent with the latter being present in an amount from 0.5–5% based on the weight of the alkyl acrylate.

9. A composition of matter comprising a substrate containing thereon a polymerization product obtained by polymerizing, at a temperature of 50–75° C. with a polymerization catalyst of gelatin and a mixture of an alkyl acrylate in which the alkyl radical contains 1–6 carbon atoms and a cross-linking agent selected from the class consisting of divinyl benzene, allyl acrylate and diallyl phthalate, said composition containing on a solids content basis from 33–85% by weight of the gelatin and from 15–67% by weight of the said mixture, the said mixture consisting of the alkyl acrylate and the cross-linking agent with the latter being present in an amount from 0.5–5% based on the weight of the alkyl acrylate.

10. A composition of matter comprising a paper substrate containing thereon a polymerization product obtained by polymerizing, at a temperature of 50–75° C. with a polymerization catalyst, a composition comprising an aqueous solution of gelatin and a mixture of an alkyl acrylate in which the alkyl radical contains 1–6 carbon atoms and a cross-linking agent selected from the class consisting of divinyl benzene, allyl acrylate and diallyl phthalate, said composition containing on a solids content basis from 33–85% by weight of the gelatin and from 15–67% by weight of the said mixture, the said mixture consisting of the alkyl acrylate and the cross-linking agent with the latter being present in an amount from 0.5–5% based on the weight of the alkyl acrylate.

References Cited in the file of this patent

UNITED STATES PATENTS

| | | |
|---|---|---|
| 2,202,846 | Garvey et al. | June 4, 1940 |
| 2,548,520 | Damschroder et al. | Apr. 10, 1951 |
| 2,643,247 | Fisher | June 23, 1953 |
| 2,697,080 | D'Alelio | Dec. 14, 1954 |
| 2,759,900 | Caldwell | Aug. 21, 1956 |
| 2,831,767 | Dann et al. | Apr. 22, 1958 |
| 2,843,562 | Caldwell | July 15, 1958 |

FOREIGN PATENTS

| | | |
|---|---|---|
| 733,093 | Great Britain | July 6, 1955 |